(12) United States Patent
Park et al.

(10) Patent No.: US 8,182,094 B2
(45) Date of Patent: May 22, 2012

(54) LIGHT SOURCE UNIT AND IMAGE PROJECTION APPARATUS HAVING THE SAME

(75) Inventors: Ki-soo Park, Yongin-si (KR); Byung-jo Kang, Suwon-si (KR); S-ru Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1005 days.

(21) Appl. No.: 11/951,356

(22) Filed: Dec. 6, 2007

(65) Prior Publication Data

US 2008/0297732 A1 Dec. 4, 2008

(30) Foreign Application Priority Data

Jun. 4, 2007 (KR) .................. 10-2007-0054591

(51) Int. Cl.
*G03B 21/18* (2006.01)
*G01J 1/00* (2006.01)
*A61N 5/06* (2006.01)
*F21V 29/00* (2006.01)

(52) U.S. Cl. .............. 353/55; 250/495.1; 250/504 R; 362/294

(58) Field of Classification Search ............... 353/55, 353/70, 72, 74, 77, 78, 79, 85, 87, 98, 99, 353/28, 88; 250/216, 221, 222.1, 494.1, 250/495.1, 504 R; 362/298, 300, 350, 360, 362/361, 294, 373; 359/443, 449; 349/11, 349/12, 16; 355/55, 70, 72, 74, 77, 78, 79, 355/85, 87, 98, 99

See application file for complete search history.

(56) References Cited

U.S. PATENT DOCUMENTS

| 5,322,651 | A | * | 6/1994 | Emmer .................. 264/410 |
| 5,833,341 | A | * | 11/1998 | Kimura et al. .................. 353/98 |
| 6,012,830 | A | * | 1/2000 | Fraizer .................. 362/539 |
| 7,048,387 | B2 | * | 5/2006 | Wei et al. .................. 353/99 |
| 7,063,423 | B2 | * | 6/2006 | Fujimori et al. .................. 353/55 |

* cited by examiner

*Primary Examiner* — Georgia Y Epps
*Assistant Examiner* — Don Williams
(74) *Attorney, Agent, or Firm* — Sughrue Mion, PLLC (57) ABSTRACT

A light source unit and an image projection apparatus are provided. The light source unit includes: a light source part including a light source and a reflective member which reflects light emitted from the light source; and an infrared ray dividing part which is provided corresponding to a shape of the reflective member, is spaced apart from the reflective member, and includes a blocking part to block part of infrared rays generated from the light source and passing through the reflective member and a passing part having an opening formed through the blocking part. The image projection apparatus includes the light source unit and a casing accommodating the light source unit.

17 Claims, 10 Drawing Sheets

LIGHT SOURCE UNIT AND IMAGE PROJECTION APPARATUS HAVING THE SAME

CROSS-REFERENCE TO RELATED APPLICATIONS

This application claims priority from Korean Patent Application No. 10-2007-0054591, filed on Jun. 4, 2007 in the Korean Intellectual Property Office, the disclosure of which is incorporated herein by reference.

BACKGROUND OF INVENTION

1. Field of Invention

Apparatuses consistent with the present invention relate to a light source unit and an image projection apparatus having the same and, more particularly, to a light source unit which can effectively block infrared rays generated from a light source, and an image projection apparatus having the same.

2. Description of Related Art

In general, an image projection apparatus forms an image on a screen, etc. and includes a TV, a projector, etc. The image projection apparatus includes a light source unit, a display device which converts light emitted from the light source unit into an image, etc. The image projection apparatus may be classified as follows according to a display type and a watching type.

According to the display type, the image projection apparatus may be classified into a digital light processing (DLP), a plasma display panel (PDP), etc. According to the watching type, the image projection apparatus may be classified into a direct-view image display device in which a user directly watches a screen thereof, and a projection-type image display device in which a user indirectly watches a projected image.

As such an image projection apparatus, a projector includes an optical system including a display device such as a DMD, etc., and a light source unit providing light to the optical system. The light source unit generates the light and simultaneously heat. Also, the light source unit generates infrared rays and ultraviolet rays, besides visible rays. The infrared rays pass through a reflective mirror, etc. reflecting the visible rays. The temperature of the part on which the passed infrared rays are irradiated is increased.

Thus, it is beneficial to effectively block the infrared rays, etc. generated from the light source unit from flowing out, to thereby enhance cooling efficiency.

SUMMARY OF INVENTION

Accordingly, it is an aspect of the present invention to provide a light source unit and an image projection apparatus having the same which can effectively block infrared rays generated from the light source unit.

Another aspect of the present invention is to provide a light source unit and an image projection apparatus having the same which can enhance cooling efficiency.

Still another aspect of the present invention is to provide a light source unit and an image projection apparatus having the same which can be slim in appearance.

Yet another aspect of the present invention is to provide a light source unit and an image projection apparatus having the same which can reduce a manufacturing cost.

Additional aspects of the present invention will be set forth in part in the description which follows and, in part, will be apparent from the description, or may be learned by practice of the present invention.

The foregoing and/or other aspects of the present invention can be achieved by providing a light source unit for an image projection apparatus, including: a light source part comprising a light source and a reflective member which reflects light emitted from the light source; and an infrared ray dividing part which is provided corresponding to a shape of the reflective member, is spaced apart from the reflective member, and comprises a blocking part to block part of infrared rays generated from the light source and passing through the reflective member and at least one passing part having at least one opening formed through the blocking part.

The light source unit may further include a cooling part which cools the light source part, and the infrared ray dividing part may be disposed in a rear part of a cooling channel formed around the reflective member by the cooling part.

The cooling part, the light source part, and the infrared ray dividing part may be sequentially disposed toward an outlet of the image projection apparatus.

The at least one passing part may include an extending plate which is extended from a side of the at least one opening.

The at least one passing part may include an a plurality of passing parts including corresponding extending plates and openings.

The extending plates may be bent to face each other with respect to the light source to block the infrared rays generated from the light source.

The extending plate may be bent to maintain the cooling channel.

The at least one opening may have at least one of a rectangular shape and a circular arc shape.

The rectangular shape or the circular arc shape may be disposed along a first direction of the cooling channel which is a circumferential direction of the reflective member.

The rectangular or the circular arc shape may be disposed along a second direction of the cooling channel which is perpendicular to a circumferential direction of the reflective member.

The light source part may further include a light source main body which supports the light source and the reflective member, and the infrared ray dividing part may be coupled to the light source main body.

The infrared ray dividing part may be coupled to the light source main body so that the infrared rays passing through the reflective member from the light source can be prevented from passing through an outlet of the image projection apparatus.

The inside of the blocking part may have one of a black body and a rough surface.

The inside of the blocking part may have an absorbing layer which absorbs the infrared rays.

The foregoing and/or other aspects of the present invention can also be achieved by providing an image projection apparatus including: a casing; a light source part which is accommodated in the casing and comprises a light source and a reflective member reflecting light emitted from the light source; an infrared ray dividing part which is provided corresponding to a shape of the reflective member, is spaced apart from the reflective member, and comprises a blocking part which blocks part of infrared rays generated from the light source and passing through the reflective member and a passing part having at least one opening formed through the blocking part.

The casing may include an outlet, and the infrared ray dividing part may be disposed adjacent to the outlet.

Here, an angle for blocking the infrared rays generated from the light source by the infrared ray dividing part may be equal to or larger than an angle between lines connecting the light source and opposite end parts of the outlet.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

In this specification, an image projection apparatus may include a TV, a projector, etc., but hereinbelow, a projector will be described as an exemplary embodiment of the present invention.

A light source unit 130 and an image projection apparatus 100 having the same consistent with the present invention will be described with reference to FIGS. 1 through 7.

The image projection apparatus 100 includes a casing 110 and the light source unit 130. The image projection apparatus 100 further includes a display device 119.

The light source unit 130 includes a light source part 140 and an infrared ray dividing part 170. The light source unit 130 further includes a cooling part 150.

The casing 110 forms an external appearance of the image projection apparatus 100 and includes an inlet 111 and an outlet 115 through which air flows inside and outside, respectively, of the casing 110.

The outlet 115 is connected to a cooling channel (not shown) for cooling components such as a light source part 140 inside of the casing 110, and discharges heated air to the outside. The outlet 115 has a plurality of through-slits 116 (see FIGS. 5-7).

The display device 119 generates an image signal using the light emitted from the light source part 140. Also, the display device 119 may include a digital micro-mirror device (DMD). The DMD is a semiconductor chip in which hundreds of thousands of micro-mirrors are integrated and generates the image signal using the light. The DMD controls the light collected by the micro-mirrors switching over five hundred thousand times per second by a digital method. The image projection apparatus 100 having such a DMD controls time when the light is reflected on the micro-mirrors to project the light, and thus, light efficiency is relatively high.

The light source part 140 includes a light source 141 which is driven by a light source substrate (not shown), a light source main body 145 (see FIG. 3), and a reflective member 143. In the case that the light source part 140 is provided as an LED, the light source part 140 may be plurally provided to emit a red light, a green light, and a blue light. In this case, the light source part 140 is mounted to a light source substrate which supports and drives the LED.

Alternatively, the light source 141 may be provided as a discharge lamp of an arc type such as, for example, a mercury lamp, a metal halide lamp, or a xenon lamp.

One side of the light source main body 145 is coupled to the casing 110, and the other side of the light source main body 145 is coupled to the reflective member 143 and the infrared ray dividing part 170 and supports the reflective member 143 and the infrared ray dividing part 170. The light source main body 145 is coupled to the infrared ray dividing part 170 by at least one coupling member 147. The coupling member 147 may include a bolt, but alternatively, may employ various known means such as a screw, a hook, etc.

The reflective member 143 reflects the light emitted from the light source 141 to a predetermined direction and forms a light path. Particularly, the reflective member 143 passes therethrough infrared rays, ultraviolet rays, etc., but reflects visible rays.

The cooling part 150 cools elements that generate heat including the display device 119 and the light source part 140 inside of the casing 110. The cooling part 150 may be provided as a cooling fan, and may further include a cooling duct (not shown).

The infrared ray dividing part 170 is disposed corresponding to a shape of the reflective member 143. The infrared ray dividing part 170 is spaced apart from the reflective member 143 so as to maintain a cooling channel formed around the reflective member 143 by the cooling part 150. The infrared ray dividing part 170 is coupled to the light source main body 145, and includes a blocking part 171 and a passing part 175.

The blocking part 171 blocks or absorbs the infrared rays generated from the light source 141 and passing through the reflective member 143. An inside of the blocking part 171 facing the reflective member 143 may be provided with a rough or a black body surface so as to effectively absorb the infrared rays. The blocking part 171 is made of material which can effectively absorb the infrared rays. Also, the blocking part 171 includes an absorbing layer 173 (see FIG. 6) in the inside surface thereof facing the reflective member 143. The blocking part 171 is provided as a plate shape, but alternatively, may have various shapes as necessary.

The absorbing layer 173 may be oxidization-coated with a dark color on the inside surface of the blocking part 171 facing the reflective member 143. Also, the absorbing layer 173 may be coated on the inside of an extending plate 179 (to be described later).

Accordingly, the absorbing layer 173 can effectively block and absorb the infrared rays.

The passing part 175 passes therethrough the infrared rays generated from the light source 141 and passing through the reflective member 143. The passing part 175 includes an opening 177 and the extending plate 179. Accordingly, the flow of cooling air formed by the cooling part 150 can be stably maintained, and heat generated from the blocking part 171 can be effectively cooled.

As shown in FIGS. 4A through 4D, the passing part 175 may have various shapes such as, for example, a rectangular, a circular arc, etc. The passing part 175 may have other various shapes including a trapezoid, a half-moon in consideration of a shape of the reflective member 143, the brightness of the light source 141, an inner space of the casing 110, a cooling capacity, etc. Further, the passing part 175 may have a single shape or a plurality of shapes.

The opening 177 is formed through the blocking part 171 so that the cooling air formed in the cooling part 150 can pass therethrough.

Figure 4A:
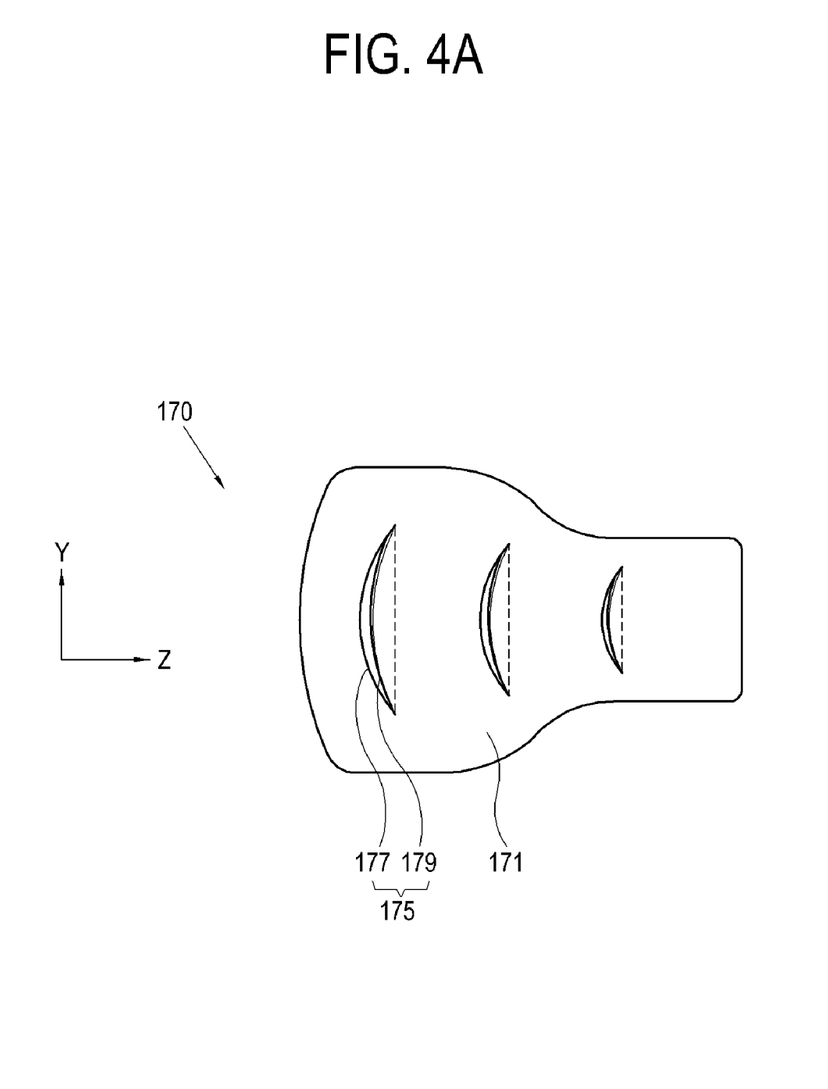
FIGS. 4A through 4D illustrate various examples of a infrared ray dividing part of the light source unit in FIG. 3.
Figure 4B:
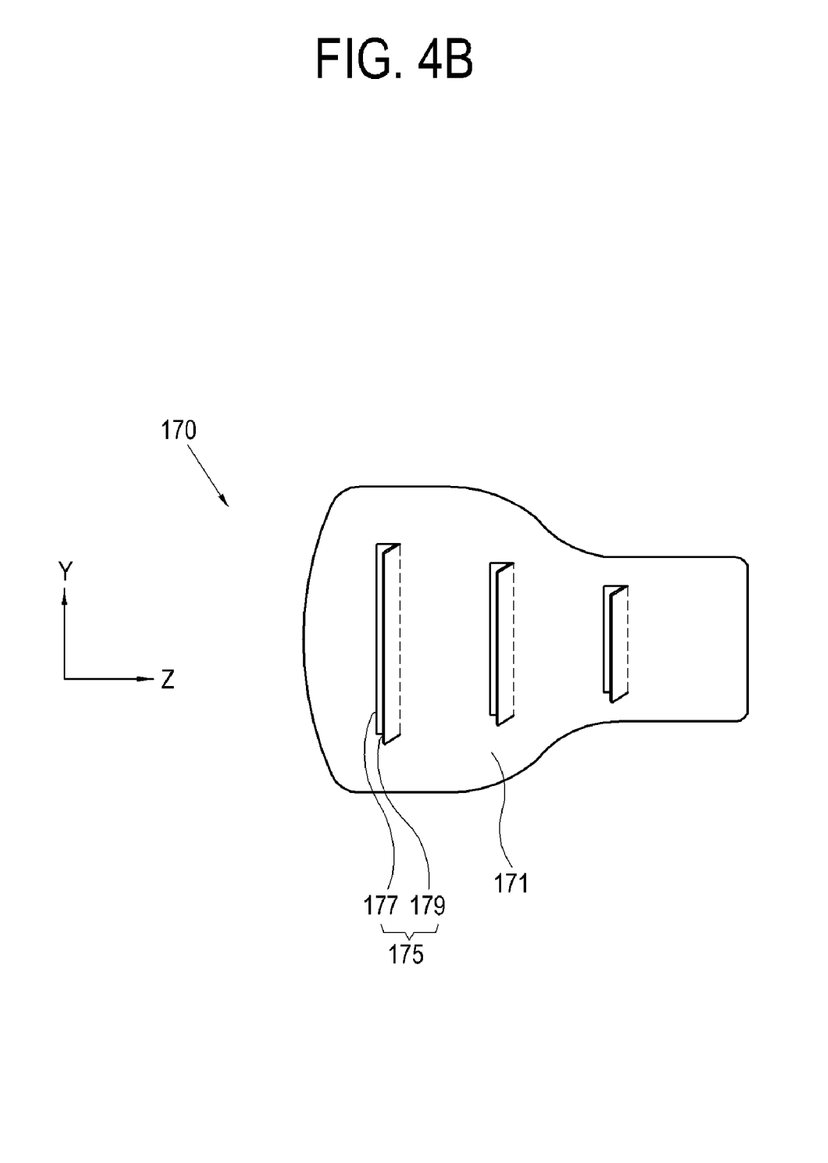

For example, as shown in FIG. 4A, the opening 177 may have a rectangular shape or a trapezoidal shape of three different sizes. Here, the opening 177 is disposed in a first direction (refer to 'first direction' in FIG. 7), which is a circumferential direction of the reflective member 143. As shown in FIG. 4B, the opening 177 may have a circular arc shape of three different sizes, and may be disposed in the first direction.

Figure 4C:
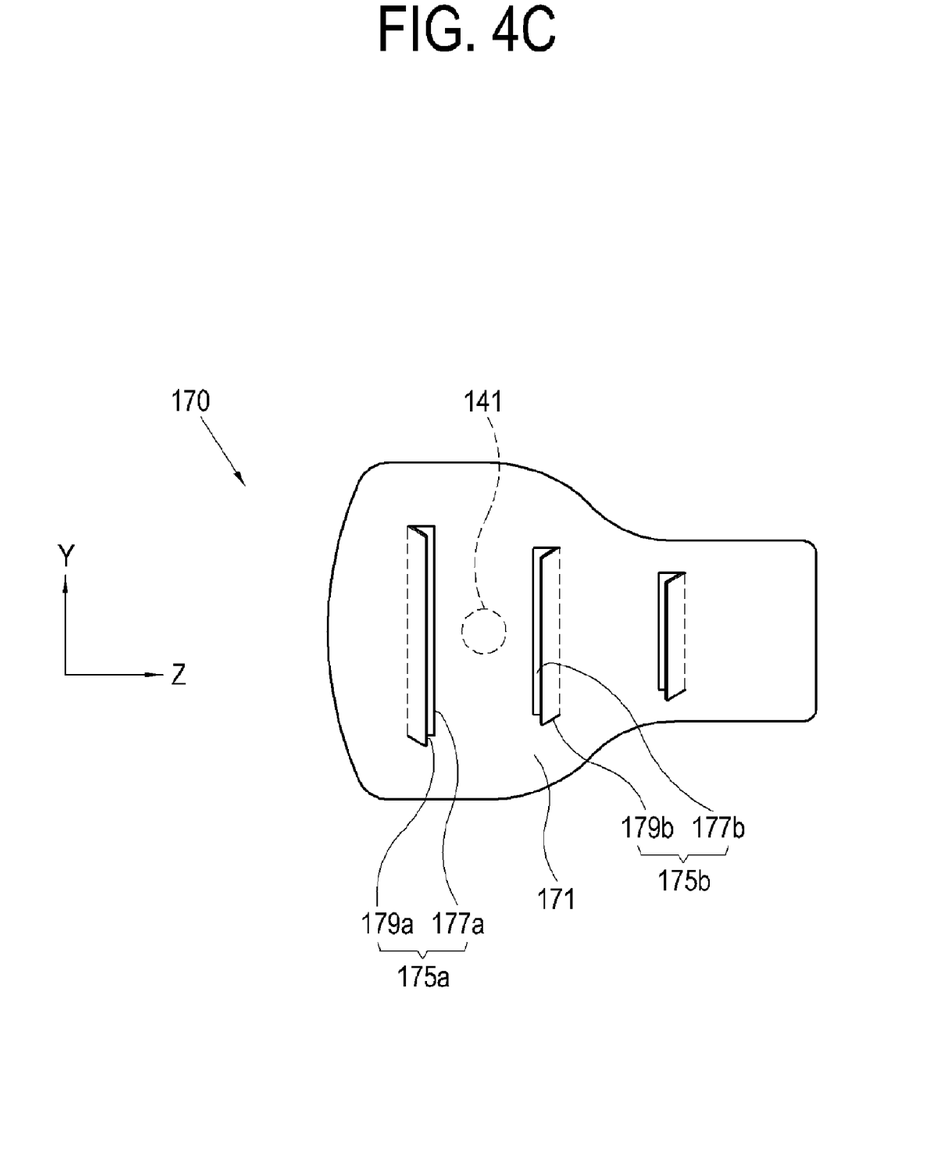

As shown in FIG. 4C, two extending plates 179 bent from the opening 177 may face each other with respect to the arrangement of the light source 141. Accordingly, as shown in an enlarged view of FIG. 6, the infrared rays passing through the opening 177 may be absorbed in the absorbing layer 173 or may be reflected in other directions.

Figure 6:
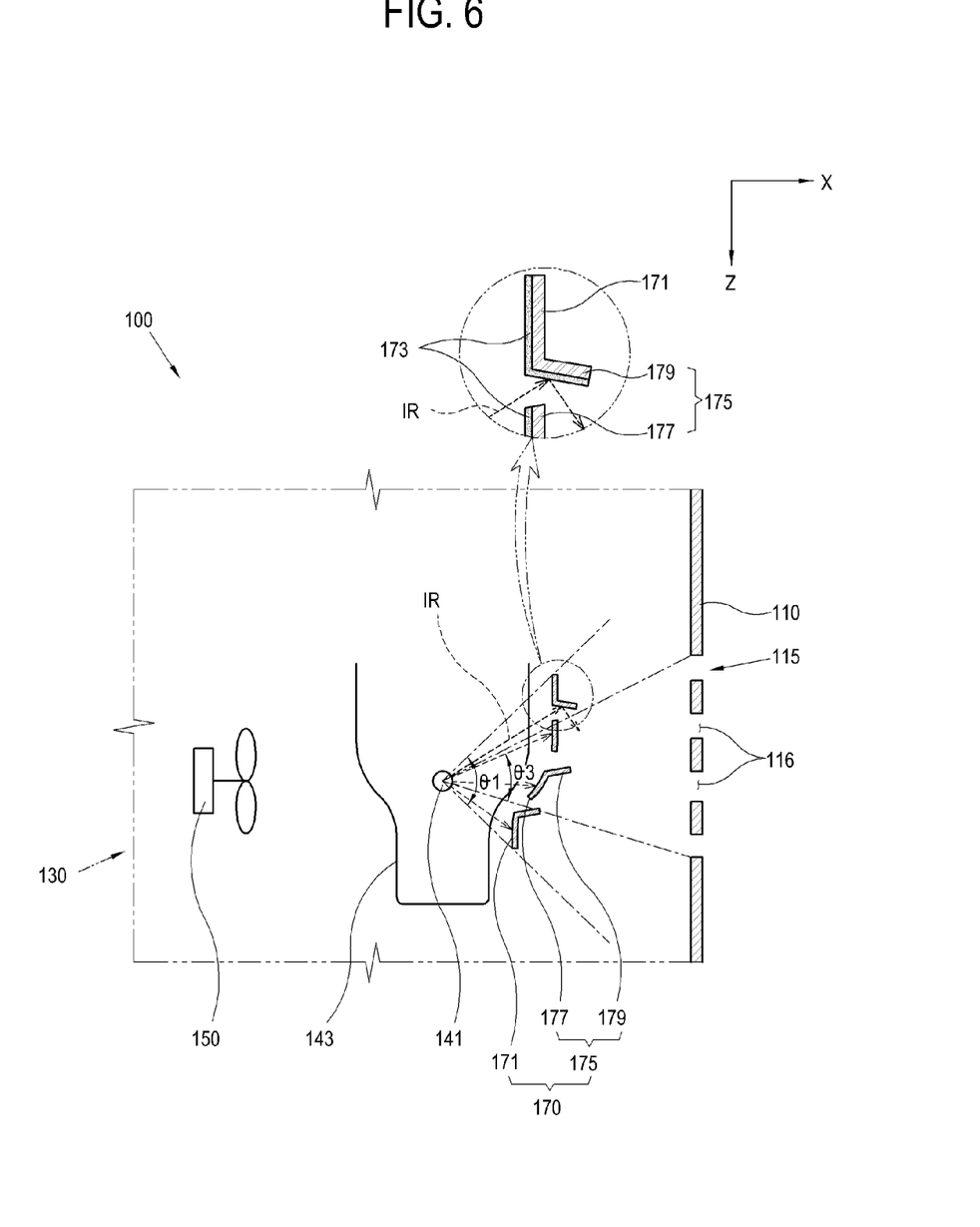

In this way, the infrared rays may be divided in various directions, thereby preventing a certain part from being intensively heated by the infrared rays.

Figure 4D:
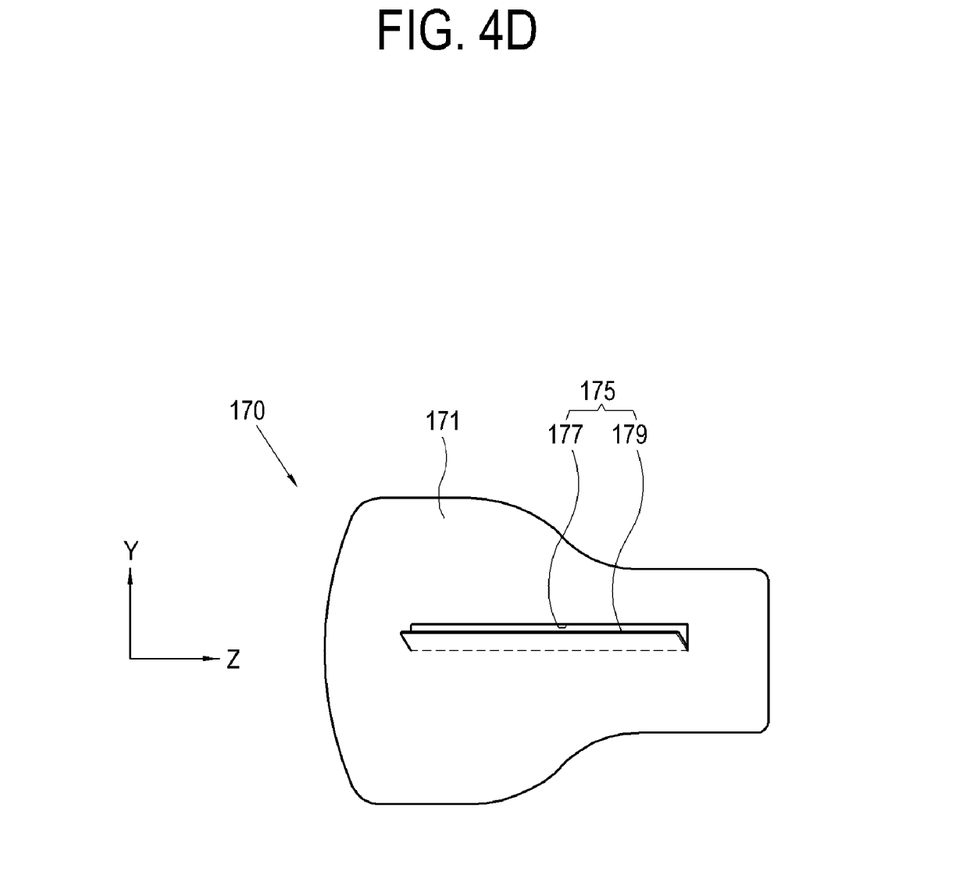

As shown in FIG. 4D, the opening 177 may have a single rectangular or trapezoidal shape. The opening 177 is disposed in a "Y" axis direction which is defined as a second direction. Herein, the opening 177 may be plurally provided along the "Y" axis direction in parallel as necessary.

Herein, the respective openings 177 may have the same or different shapes.

The extending plate 179 is bent and extended from one side of the opening 177. The extending plate 179 may include the absorbing layer 173 which can absorb the infrared rays, on a side thereof facing the infrared rays. The extending plate 179 is bent so as to maintain the cooling channel formed around the reflective member 143 by the cooling part 150. Accordingly, the extending plate 179 can maintain the cooling channel while partially absorbing the infrared rays directed to the outside through the opening 177.

The extending plates 179 may be bent facing each other with respect to the light source 141 so as to block the infrared rays generated from the light source 141. For example, assuming that the light source 141 is placed in a central area of the opening 177a and 177b, as shown in FIG. 4C, the right extending plate 179b may be extended from the right opening 177b and the left extending plate 179a may be extended from the left opening 177a. Accordingly, the infrared rays passing through the opening 177a and 177b may be partially blocked, absorbed, or reflected by the inside of the extending plate 179a and 179b. Also, the extending plate 179a and 179b may be bent so as to maintain the cooling channel, to thereby prevent lowering of cooling efficiency of the cooling part 150.

As described above, the infrared rays generated from the light source 141 and passing through the reflective member 143 are blocked or absorbed by the blocking part 171. Accordingly, it is possible to prevent various components from being directly affected or deformed by the infrared rays, and thus, material having thermal resistance, a silver paper reflecting the infrared rays, or the like is not needed, thereby reducing a manufacturing cost.

Also, the passing part 175 can maintain the cooling channel of the cooling part 150, thereby making the apparatus slim while maintaining the cooling efficiency in a predetermined space as it is.

With this configuration, an operation process of the light source unit 130 and the image projection apparatus 100 having the same consistent with the present invention will be described with reference to FIG. 2 and FIGS. 5 through 7.

Figure 1:
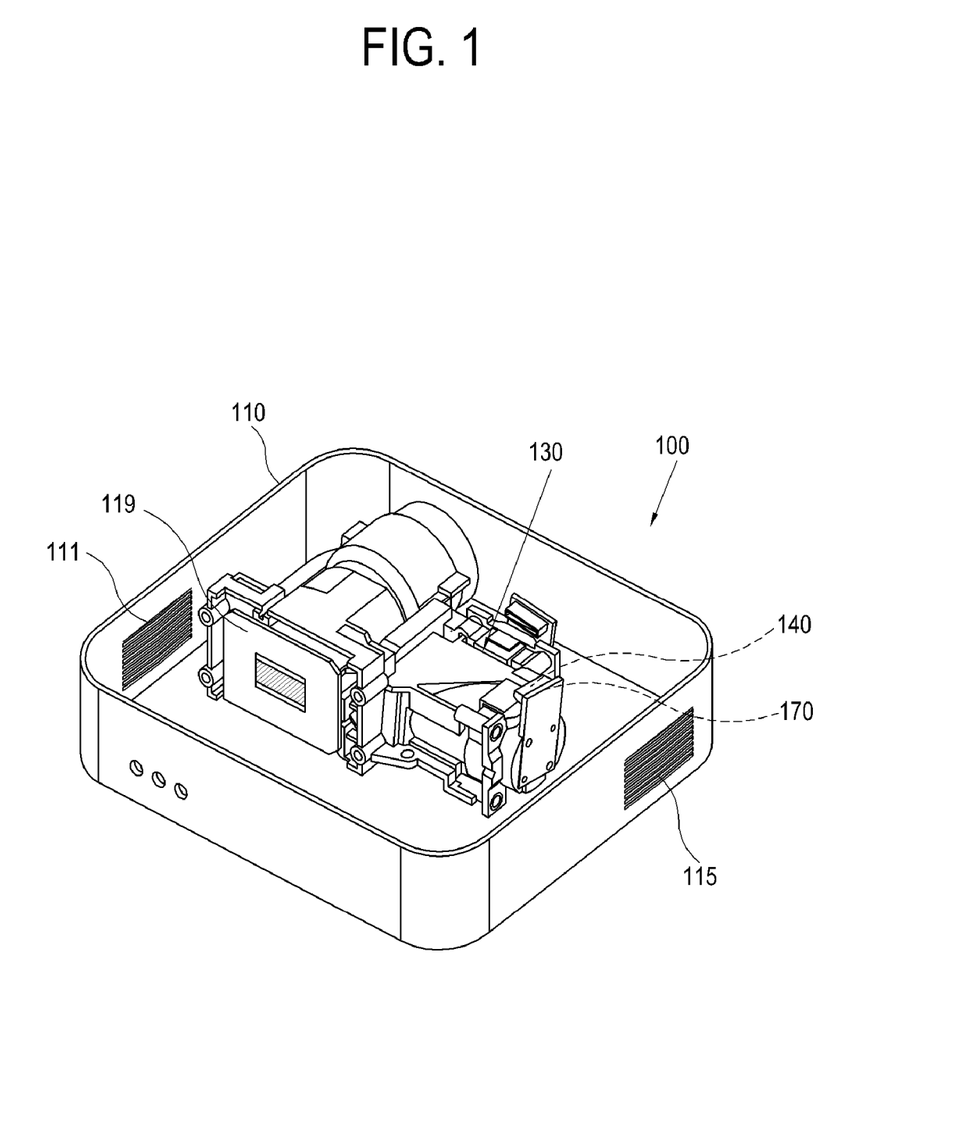
FIG. 1 is a schematic perspective view illustrating an image projection apparatus mounted with a light source unit according to a first exemplary embodiment of the present invention.
Figure 2:
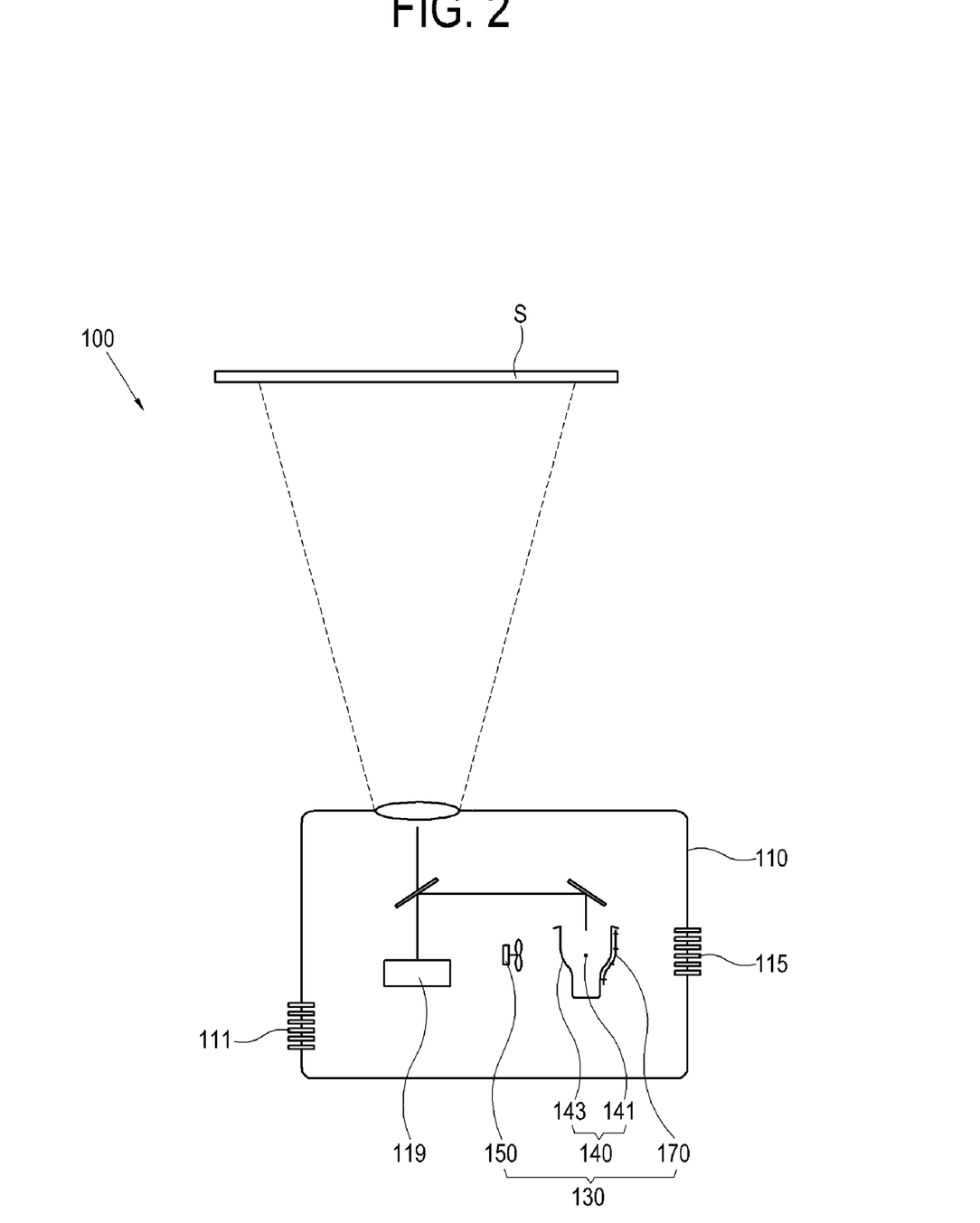
FIG. 2 is a schematic view of the image projection apparatus in FIG. 1.
Figure 3:
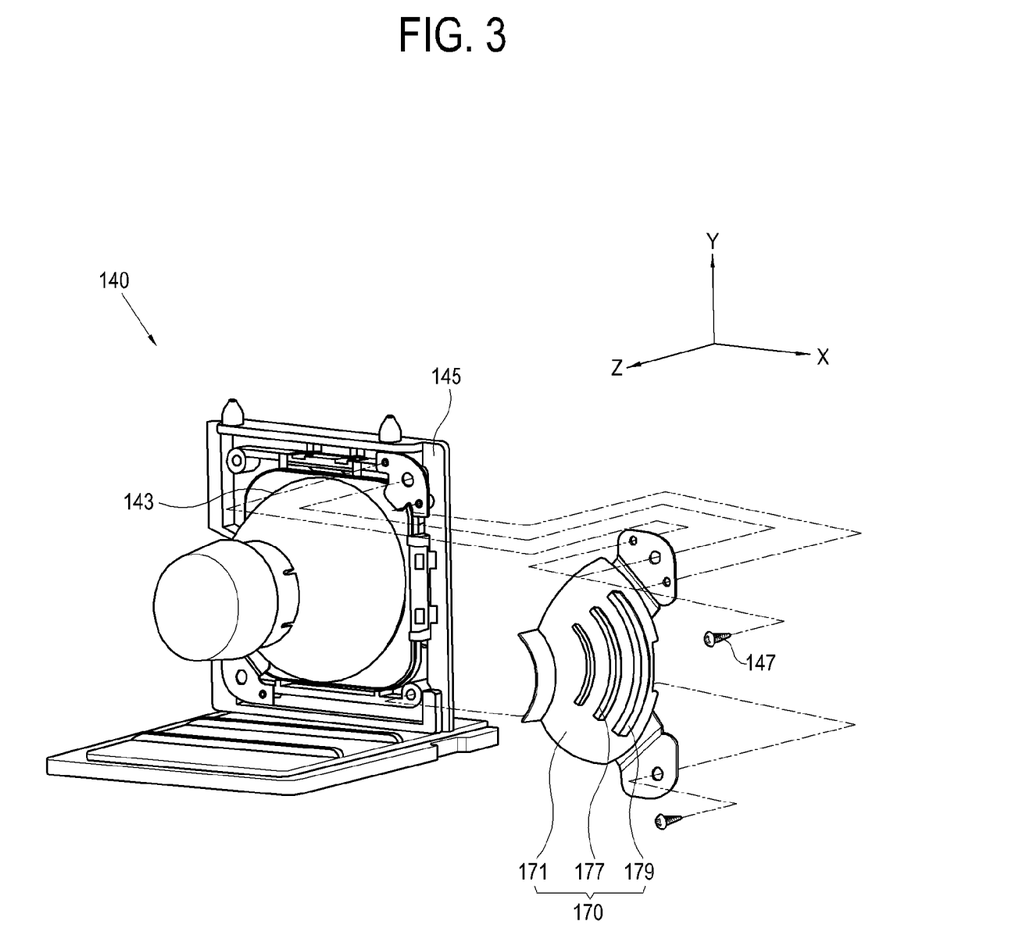
FIG. 3 is an exploded perspective view of the light source unit in FIG. 1.

First, the process of forming an image on a screen S will be described as follows, referring to FIG. 2.

Each light source substrate drives the light source 141 such as an LED or a mercury lamp, and emits light. Part of the light from the light source 141 is reflected by the reflective member 143, and is concentrated by various lenses (not shown). The light is selectively projected or reflected according to a wavelength of the light. Also, the light having a uniform brightness in the light path, arrives at the display device 119 to form the image, which is projected on the screen S. In this process, the infrared rays and the ultraviolet rays passing through the opening 177 may thermally affect various components in the casing 110.

Figure 5:
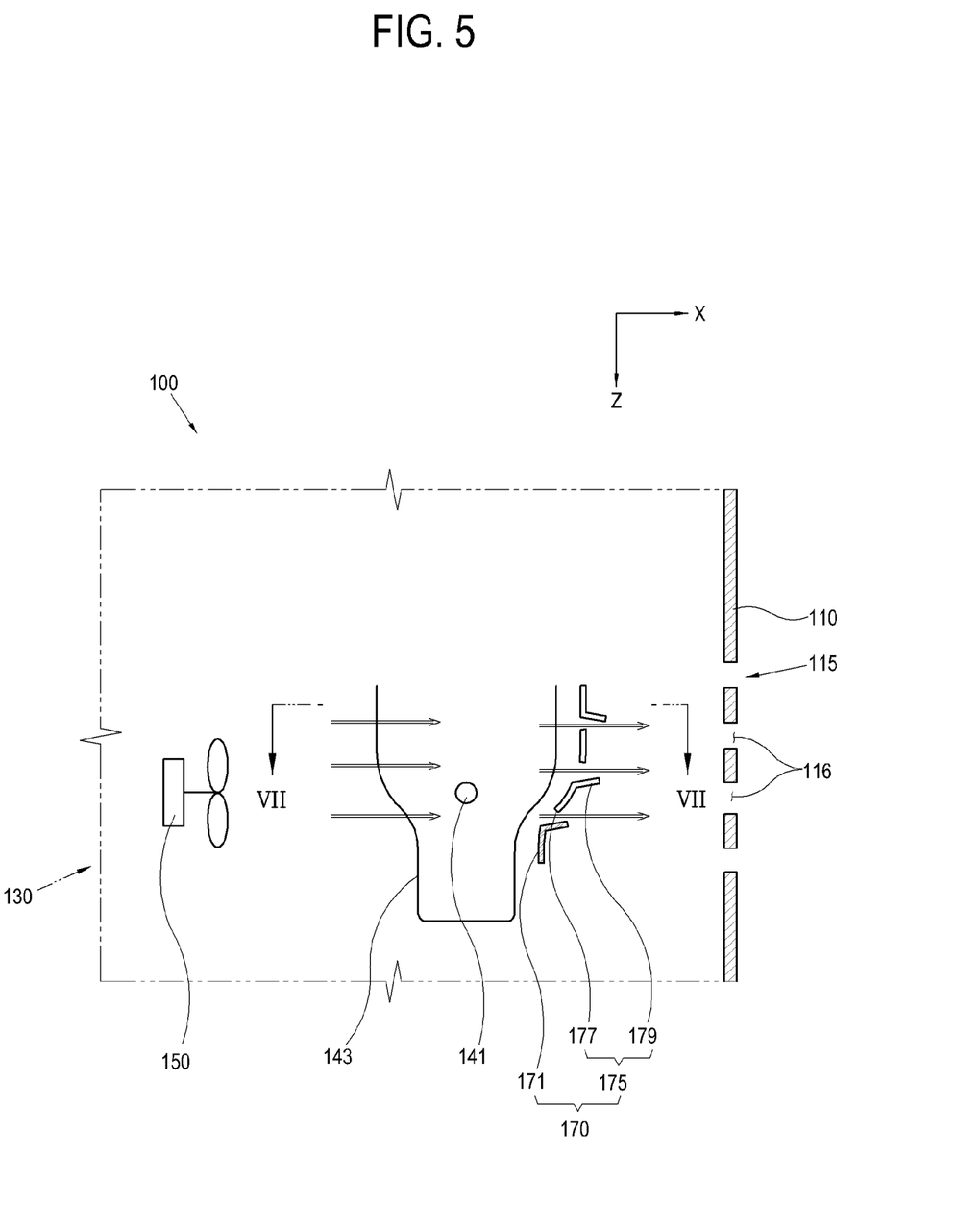
FIGS. 5 through 7 are schematic views for illustrating an operation process of the image projection apparatus in FIG. 1.

Next, as shown in FIG. 5, the cooling air generated in the cooling part 150 (represented as "⇒" in the figure) forms the cooling channel around a circumferential surface of the reflective member 143 and cools the reflective member 143. At the same time, the cooling air flowing along the inside of the infrared ray dividing part 170 may form a cooling channel which passes through the passing part 175 and is directed to the outlet 115. The infrared ray dividing part 170 whose temperature is somewhat increased while blocking and absorbing the infrared rays is disposed in the cooling channel and cooled by the cooling part 150.

As shown in FIG. 6, the infrared rays (hereinbelow, represented as an arrow of a thick or a fine dotted line, and represented as a reference number "IR" in the figure) generated from the light source 141 may be divided into a first part directing to the infrared ray dividing part 170 and a second part directing to the outside of the infrared ray dividing part 170. Herein, the size of the infrared ray dividing part 170 may be properly selected in consideration of the amount of the generated infrared rays, the cooling channel, the position of the cooling part 150, the position of the outlet 115, etc.

Also, the infrared rays directed to the infrared ray dividing part 170 may be divided into one part (refer to the arrow of the fine dotted line in FIGS. 6 and 7) which passes through the reflective member 143 and is blocked and absorbed by the blocking part 171 and the other part (refer to the arrow of the thick dotted line in FIGS. 6 and 7) which passes through the passing part 175.

The one part of the infrared rays is blocked and absorbed by the absorbing layer 173 of the blocking part 171. Accordingly, the temperature of the blocking part 171 may be increased by the blocking and absorption of the infrared rays.

The other part of the infrared rays passing through the passing part 175 passes through the opening 177, goes straight without contacting the extending plate 179, and is directed to the outside of the infrared ray dividing part 170. Meanwhile, some infrared rays passing through the opening 177 are, as shown in the enlarged view of FIG. 6, partially absorbed or reflected by the extending plate 179.

Further, it is preferable but not necessary that an angle (refer to "θ1" of XZ plane in FIG. 6) between the lines connecting the upper end part and the lower end part of the infrared ray dividing part 170 from the light source is equal to or larger than an angle (refer to "θ3" of XZ plane in FIG. 6) between the lines connecting the upper end part and the lower end part of the outlet 115 from the light source. Thus, the infrared rays directed to the outlet 115 can be reduced.

Figure 7:
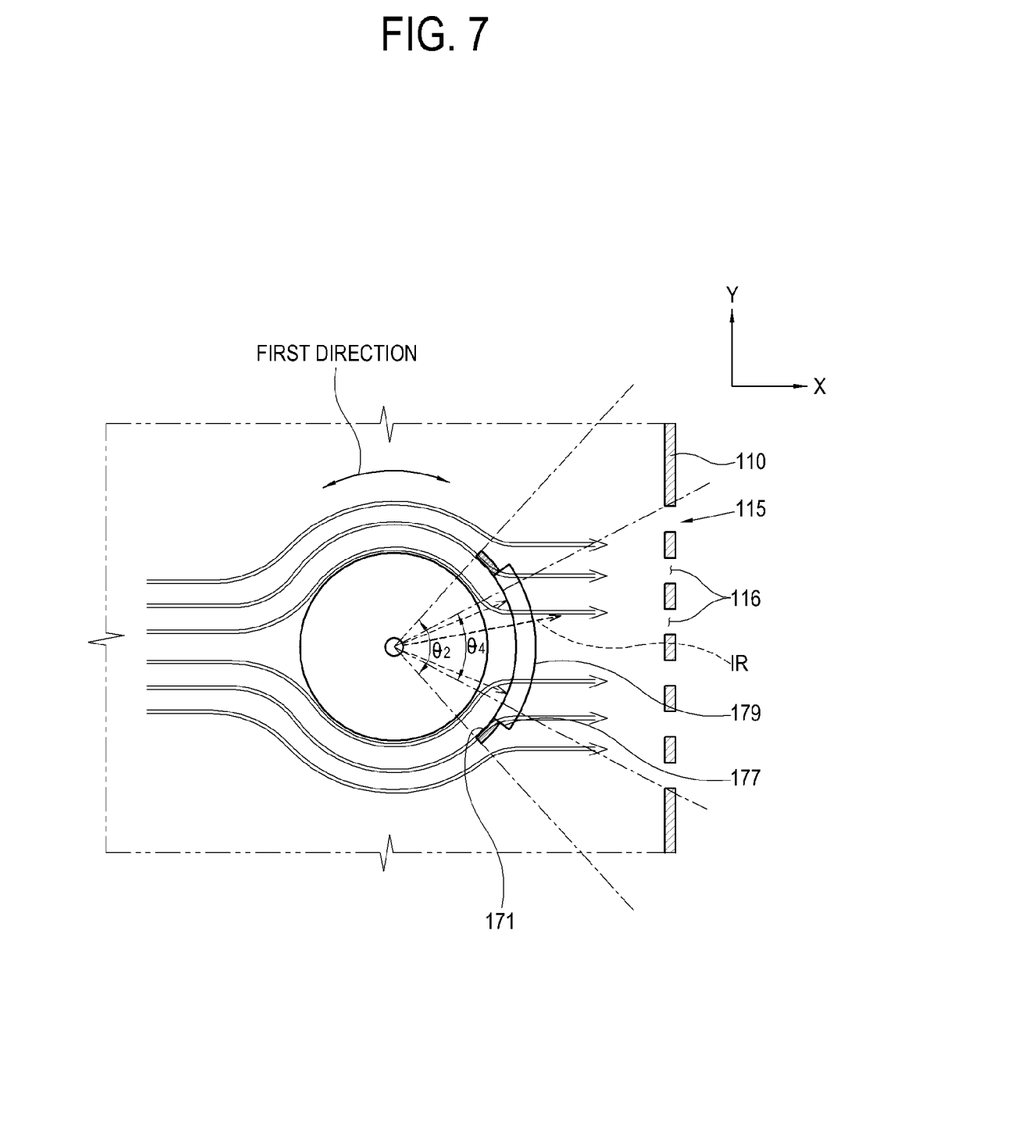

FIG. 7 is a sectional view taken along line VII-VII in FIG. 5. As shown in FIG. 7, the cooling air formed by the cooling part 150 forms the cooling channel around the circumferential surface of the reflective member 143. Accordingly, the cooling air flowing along the cooling channel passes through the passing part 175 without any resistance and is discharged to the outlet 115.

Also, it is preferable but not necessary that an angle (refer to "θ2" of XY plane in FIG. 7) between the lines connecting the upper end part and the lower end part of the infrared ray dividing part 170 from the light source is equal to or larger than an angle (refer to "θ4" of XY plane in FIG. 7) between the lines connecting the upper end part and the lower end part of the outlet 115 from the light source. Accordingly, the infrared rays directed to the outlet 115 can be reduced.

In this process, the infrared ray dividing part 170 may be disposed adjacent to the outlet 115, to thereby enhance the cooling efficiency.

Also, the image projection apparatus consistent with the present invention may be applied not only to a single display device but also to a multiple display device.

As described above, consistent with the present invention, the infrared rays generated from the light source can be effectively prevented. Also, the cooling efficiency can be improved. Further, a slim appearance can be achieved. Still further, material costs can be reduced.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A light source unit for an image projection apparatus, comprising:
   a light source part comprising a light source and a reflective member which reflects light emitted from the light source; and
   an infrared ray dividing part which is provided corresponding to a shape of the reflective member, is spaced apart from the reflective member, and comprises a blocking part to block part of infrared rays generated from the light source and passing through the reflective member and at least one passing part having at least one opening formed through the blocking part,
   wherein the at least one opening is configured to allow infrared rays and cooling air to pass therethrough.

2. The light source unit according to claim 1, further comprising a cooling part which cools the light source part, wherein the infrared ray dividing part is disposed in a rear part of a cooling channel formed around the reflective member by the cooling part.

3. The light source unit according to claim 2, wherein the cooling part, the light source part, and the infrared ray dividing part are sequentially disposed toward an outlet of the image projection apparatus.

4. The light source unit according to claim 2, wherein the at least one passing part comprises an extending plate which is extended from a side of the at least one opening.

5. The light source unit according to claim 4, wherein the at least one passing part comprises a plurality of passing parts including corresponding extending plates and openings.

6. The light source unit according to claim 5, wherein the extending plates are bent to face each other with respect to the light source to block the infrared rays generated from the light source.

7. The light source unit according to claim 4, wherein the extending plate is bent to maintain the cooling channel.

8. The light source unit according to claim 2, wherein the at least one opening has at least one of a rectangular and a circular arc shape.

9. The light source unit according to claim 8, wherein the rectangular or the circular arc shape is disposed along a first direction of the cooling channel which is a circumferential direction of the reflective member.

10. The light source unit according to claim 8, wherein the rectangular or the circular arc shape is disposed along a second direction of the cooling channel which is perpendicular to a circumferential direction of the reflective member.

11. The light source unit according to claim 1, wherein the light source part further comprises a light source main body which supports the light source and the reflective member, and the infrared ray dividing part is coupled to the light source main body.

12. The light source unit according to claim 11, wherein the infrared ray dividing part is coupled to the light source main body so that the infrared rays passing through the reflective member from the light source can be prevented from passing through an outlet of the image projection apparatus.

13. The light source unit according to claim 1, wherein an inside of the blocking part comprises one of a black body and a rough surface.

14. The light source unit according to claim 1, wherein an inside of the blocking part comprises an absorbing layer which absorbs the infrared rays.

15. An image projection apparatus comprising:
    a casing;
    a light source part which is accommodated in the casing and comprises a light source and a reflective member reflecting light emitted from the light source;
    an infrared ray dividing part which is provided corresponding to a shape of the reflective member, is spaced apart from the reflective member, and comprises a blocking part which blocks part of infrared rays generated from the light source and passing through the reflective member and a passing part having at least one opening formed through the blocking part,
    wherein the at least one opening is configured to allow infrared rays and cooling air to pass therethrough.

16. The image projection apparatus according to claim 15, wherein the casing comprises an outlet, and the infrared ray dividing part is disposed adjacent to the outlet.

17. The image projection apparatus according to claim 16, wherein an angle for blocking the infrared rays generated from the light source by the infrared ray dividing part is equal to or larger than an angle between lines connecting the light source and opposite end parts of the outlet.

* * * * *